(12) United States Patent  
Chan

(10) Patent No.: US 6,359,611 B2  
(45) Date of Patent: *Mar. 19, 2002

(54) FINGER CONTROLLED COMPUTER MOUSE

(76) Inventor: Kwan-Ho Chan, 4803 1st Pl., Lubbock, TX (US) 79410

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,312

(22) Filed: May 19, 1999

Related U.S. Application Data

(60) Provisional application No. 60/086,170, filed on May 20, 1998.

(51) Int. Cl.[7] .................................................. G09G 3/02
(52) U.S. Cl. ........................ 345/156; 345/157; 345/158; 345/161; 345/162
(58) Field of Search .................... 345/156, 157, 345/161, 162, 163, 158, 164, 165, 166, 167; 341/20

(56) References Cited

U.S. PATENT DOCUMENTS

| | | | |
|---|---|---|---|
| 3,835,464 A | * 9/1974 | Rider | 340/324 |
| 5,122,785 A | 6/1992 | Cooper | 340/710 |
| 5,260,696 A | * 11/1993 | Maynard, Jr. | 345/163 |
| 5,355,148 A | * 10/1994 | Anderson | 345/166 |
| 5,374,942 A | 12/1994 | Gilligan et al. | 345/157 |
| 5,576,733 A | * 11/1996 | Lo | 345/163 |
| 5,640,178 A | * 6/1997 | Endo et al. | 345/161 |
| 5,790,102 A | * 8/1998 | Nassimi | 345/163 |
| 5,841,425 A | * 11/1998 | Zenz, Sr. | 345/163 |
| 5,923,318 A | * 7/1999 | Zhai et al. | 345/157 |
| 6,005,553 A | * 7/1999 | Goldstein | 345/163 |
| 5,963,197 A | * 10/1999 | Bacon et al. | 345/163 |
| 5,966,118 A | * 10/1999 | Miyakawa | 345/163 |
| 5,973,671 A | * 10/1999 | Kuo | 345/157 |
| 5,973,674 A | * 10/1999 | Buecker | 345/166 |

* cited by examiner

Primary Examiner—William A. Cuchlinski, Jr.  
Assistant Examiner—Marthe Y. Marc-Coleman  
(74) Attorney, Agent, or Firm—Pandiscio & Pandiscio M

(57) ABSTRACT

An electronic mouse controlled substantially by finger movement. The translation of the mouse can be controlled by the index finger placed over a primary selection button. A device for facilitating translation of the mouse are provided for in the primary selection button. The device for facilitating translation include, but are not limited to, concave depressions, protrusions and surface texture with a high coefficient of friction.

48 Claims, 8 Drawing Sheets

FINGER CONTROLLED COMPUTER MOUSE

REFERENCE TO EARLIER APPLICATION

This application claims the benefit of prior pending U.S. Provisional Patent Application Ser. No. 60/086,170, filed May 20, 1998 by Kwan-Ho Chan for FINGER CONTROLLED COMPUTER MOUSE, which document is hereby incorporated herein by reference.

FIELD OF THE INVENTION

The present invention relates to pointing devices for controlling cursors on displays for personal computers and workstations and laptop computers and the like, and more particularly to devices and methods for translating the position of a computer mouse by finger movements.

BACKGROUND OF THE INVENTION

The most common form of pointing devices for personal computers and workstations is the electronic mouse.

Touch pads and pointer sticks, because of their compact nature, are the most commonly integrated pointing devices for laptop computers. Most laptop computers also permit an external mouse to be used with the laptop.

The most common form of electronic mouse uses a rubberized ball on the underside of the mouse. Translation of the mouse causes the rubberized ball to roll. The rubberized ball is in contact with a pair of encoder shafts. Rolling motion of the rubberized ball in turn causes the encoder shafts to rotate. The rotation of the encoder shafts, and wheels associated therewith, generates a quadrature signal by the use of two pairs of LED's and photodetectors. This electronic signal is representative of the translation of the position of the mouse.

In operation, the mouse is grasped with the hand, and movement of the mouse is effected by wrist motion and/or arm motion. The index and middle fingers are poised over actuator buttons, which can vary from one to three buttons and are generally located over the upper distal surface of the mouse.

Prolonged use of the typical electronic mouse necessarily requires prolonged activation of muscles controlling the wrist and arm. It is well known that such prolonged use of the arm and wrist can result in a repetitive stress injury such as carpal tunnel syndrome.

The electronic mouse is preferably used on a mouse pad which is essentially an 8.5 inch by 8.5 inch rubberized mat. The texture on the upper surface of the mouse pad provides traction for the rubberized ball. The size of the mouse pad accommodates the travel of the electronic mouse such that, in moving the cursor from one edge of the display screen to the opposite edge, the rubberized ball of the electronic mouse does not move beyond the edges of the mouse pad.

Many users, particularly users of laptops who choose to use an electronic mouse instead of the integrated pointing device (e.g., touch pad and/or pointer stick) on the laptop, find the mouse pad to be too large.

Many laptop computers now have computing power and display screens comparable to desktop personal computers. More and more, laptop computers are being used as desktop computer replacements. The laptop computers generally have a smaller footprint than desktop personal computers. Many users who use laptop computers as desktop computer replacements prefer to use an externally attached electronic mouse as a pointing device.

Many users find the use of an electronic mouse to be more intuitive, and to provide better control of the cursor on the display screen, than the laptop pointer stick. The pointer stick requires an external button to activate a selection after positioning the cursor at a desired location on the display screen. To click the selection button, the user either has to re-position their digit (usually the index finger) over the selection button or use another digit (such as the thumb) to click the selection button. Many users find this secondary maneuver to be cumbersome.

The touch pad also suffers from similar disadvantages when making a selection. More particularly, with the touch pad, movement of the cursor is controlled by movement of the tip of a finger over the surface of the touch pad. When a desired location of the cursor is reached, to make a selection, the user has to make a distinct tap on the surface of the touch pad, i.e., by lifting the finger off the surface of the touch pad and then hitting the surface of the touch pad with the tip of the finger. Because there is no distinct mechanical clicking associated with the act of selection, the user is not provided with an immediate sensory feedback to signal a successful selection. Touch pads are also typically provided with external selection buttons, but these are associated with the same disadvantages previously described for the pointer stick.

Unfortunately, however, a typical electronic mouse, because of its size and long cable, does not allow for easy storage, e.g., with a mobile laptop computer.

To minimize the risk of repetitive stress injury and to improve the ease of use of the electronic mouse, there is a need for a novel electronic mouse that integrates the pointing and selection functions. There is also a need for a smaller electronic mouse that can operate on a mouse pad with a smaller footprint.

OBJECT OF THE INVENTION

The present invention substantially overcomes the foregoing limitations of typical prior art electronic pointing devices by providing an electronic mouse in which the pointing and selection functions can be controlled by a single finger. Thus, the risk of repetitive stress injury is minimized by avoiding the constant wrist and arm movements used to control the movements of a conventional mouse. The present invention can be implemented with a optomechanical mouse or with an optical mouse.

It is, therefore, an object of the present invention to provide a pointing device controlled substantially by finger movement.

It is another object of the present invention to provide a pointing device in which the movement of the pointing device and the selection button are operated by the same finger.

Another object of the present invention is to provide an electronic mouse that can operate over a mouse pad with a small footprint.

It is yet another object of the present invention to provide an electronic mouse that allows for easy storage and deployment.

SUMMARY OF THE INVENTION

The present invention substantially overcomes the foregoing limitations of typical prior art electronic pointing devices by providing an electronic mouse controlled substantially by finger movement. The translation of the mouse can be controlled by the index finger placed over the primary selection button. Means for facilitating translation of the position of the mouse are provided for in the primary selection button. Means for facilitating translation of the position of the mouse include, but are not limited to, concave depressions, protrusions, and surface texture having a high coefficient of friction.

Brief Description Of The Drawings

The invention is described in detail below with reference to the following drawings, throughout which similar reference characters denote similar features, and further wherein.

DETAILED DESCRIPTION OF THE PREFERRED EMBODIMENT

Figure 1:
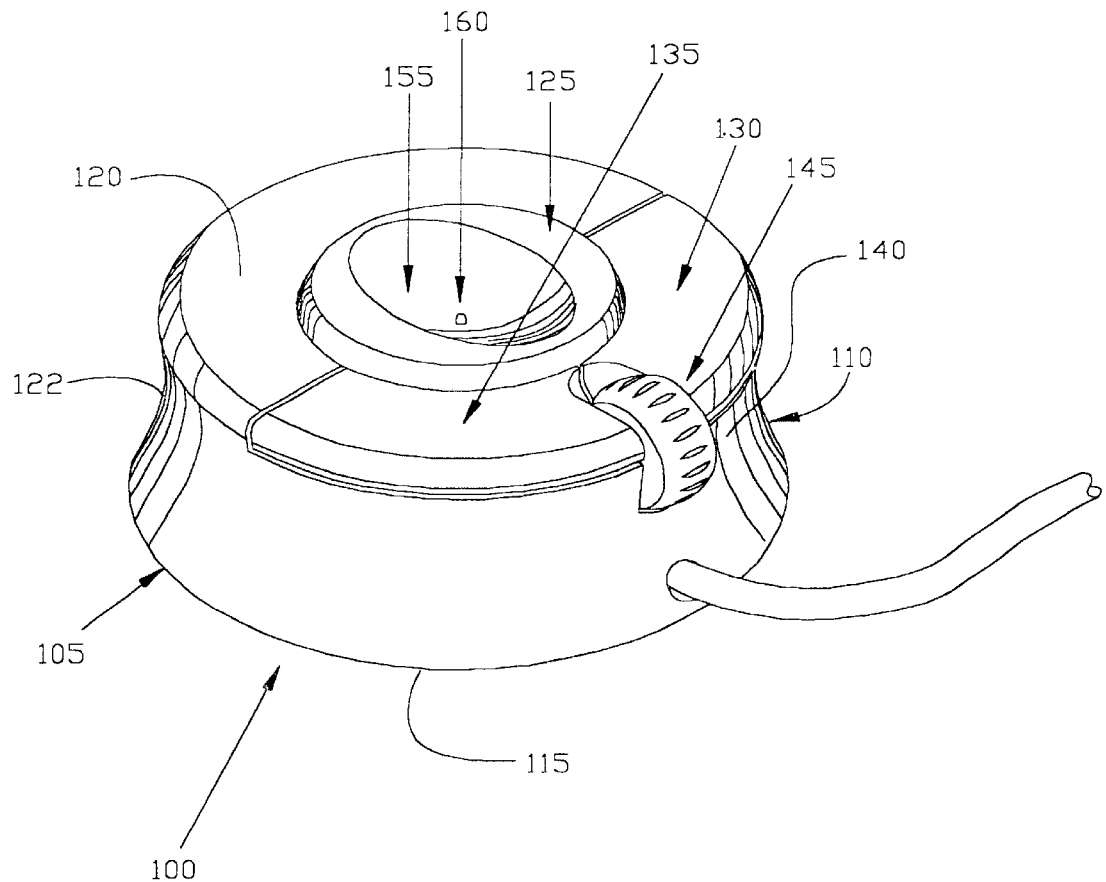
FIG. 1 is a perspective view of a preferred embodiment of the present invention.

A preferred embodiment of the present invention is shown in FIG. 1. More particularly, there is shown an electronic mouse 100 which comprises a housing 105 for containing the mechanical and electronic components (not shown) of the mouse, which mechanical and electronic components are of the sort well known in the art. Housing 105 can be circular or oval in shape, or any other shape that is considered to be ergonomically suitable. The side walls 110 of mouse 100 are inclined inwards, from the bottom 115 to the top 120, so as to define a circumferential groove 122 which is adapted to accommodate the thumb and fingers of a user.

A primary button 125 is centrally located on the upper surface of the mouse. This primary button 125 is preferably substantially equivalent to the "left" button of a typical electronic mouse.

One construction of this embodiment of mouse may include a rubberized ball (not shown) located on the bottom 115 of the mouse, directly below the primary button 125. An alternate embodiment may employ an electrical pickup (not shown), which detects movement of the mouse relative to an accompanying pad. Another embodiment may employ an optical motion detector component which detects movement of the mouse relative to any visually-discernible surface.

A second button 130 and a third button 135 are preferably disposed in the periphery of housing 105, preferably at the distal end (i.e., the forward end) 140 of housing 105, to the right and left of the primary button 125, respectively. The second and third buttons 130, 135, function similar to the "right" and "middle" buttons of a typical three-button electronic mouse. A scrolling wheel 145, for activating scrolling, is preferably located between the second and third buttons, 130, 135, distally (i.e., forwardly) of the primary button 125.

Figure 2:
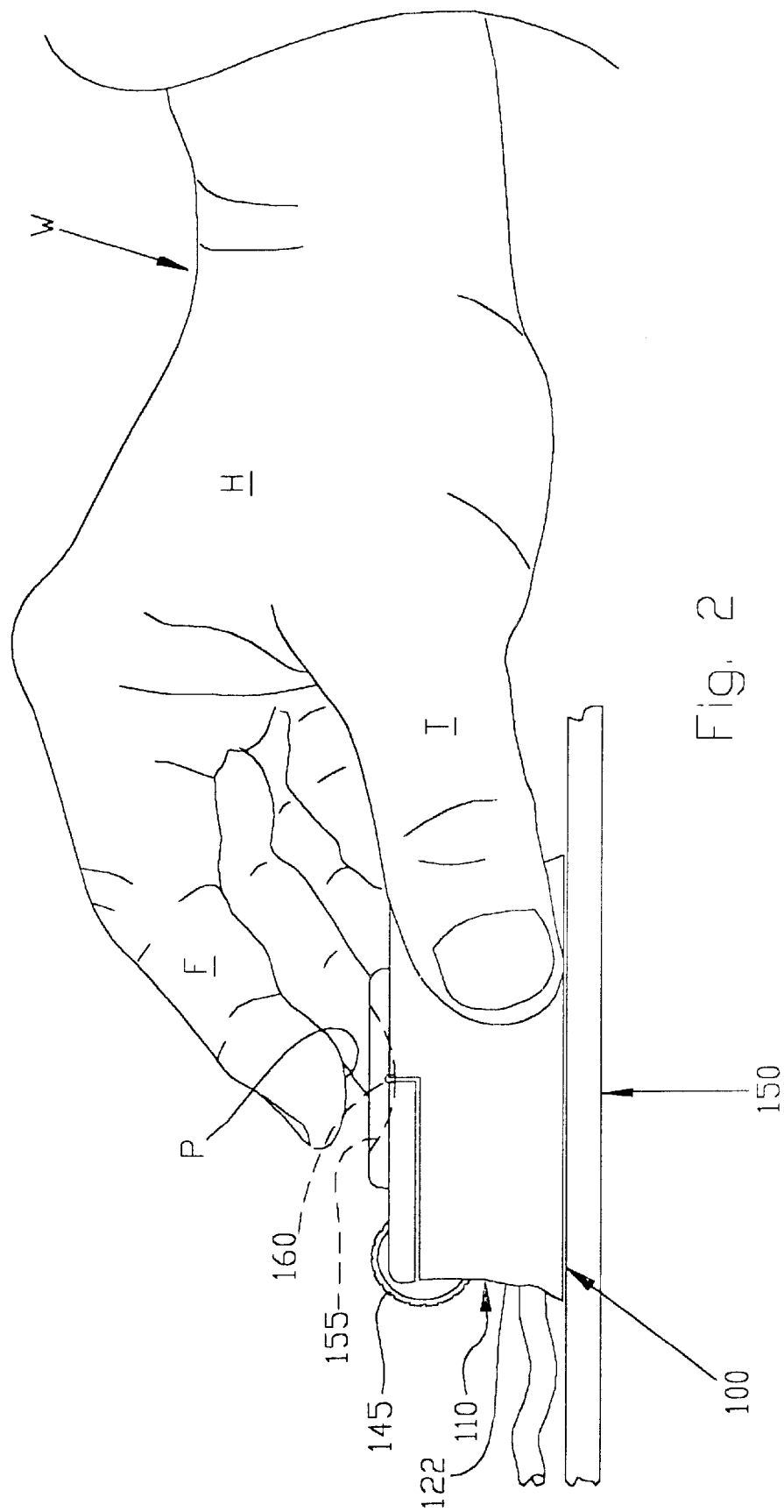
FIG. 2 is a side elevational view of the mouse of FIG. 1 being manipulated by the hand of a user.
Figure 3:
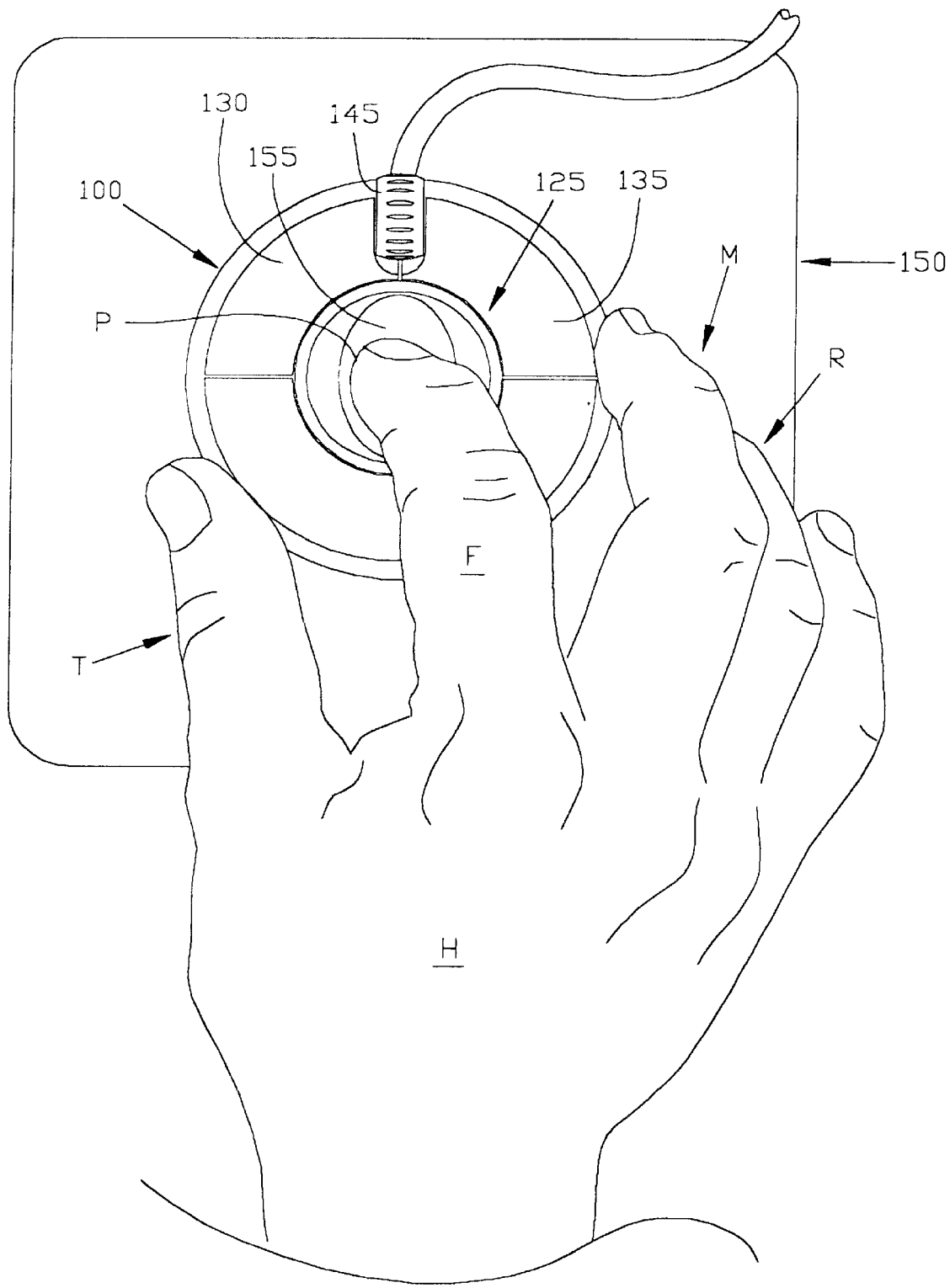
FIG. 3 is a top plan view of the mouse shown in FIGS. 1 and 2 being manipulated by the hand of a user.

Referring now to FIGS. 2 and 3, a small mouse pad 150, measuring about 4 inches by 4 inches, may also be provided. Mouse pad 150 may be made of materials well known in the art so as to provide traction for a rubberized ball.

Still looking now at FIGS. 2 and 3, typical operation of the present mouse involves clasping the mouse 100 between the user's thumb T and middle finger M of the user's right hand H. Although this embodiment is described in terms of right-handed operations, it is also possible to accommodate left-handed operations as well. The thumb T and middle finger M fit into the conforming groove 122 in the wall 110 of the housing 105. The groove 122 also prevents the mouse 100 from slipping off thumb T and middle finger M when the mouse is picked up. The tip P of the index finger F is positioned in the depression 155 of primary button 125.

The invention provides two ways to control the movement of mouse 100, and thus the movement of an associated cursor (not shown) on a computer display screen (also not shown).

In one method, mouse movement is controlled with the user's thumb T and middle finger M, in the manner shown in FIGS. 2 and 3. Movement of mouse 100 in the y direction (i.e., distally and proximally) is controlled by flexing and extending thumb T and middle finger M simultaneously while grasping mouse 100. Flexing thumb T and middle finger M pulls mouse 100 toward the user, translating mouse 100 in the negative y direction (i.e., proximally) and causing corresponding cursor movement. Extending thumb T and middle finger M pushes the mouse away from the user, translating the position of mouse 100 in the positive y direction (i.e., distally) and causing corresponding cursor movement.

To move mouse 100 in the positive x direction (i.e., laterally to the right) so as to cause corresponding cursor movement, mouse 100 is pushed to the right with thumb T. To move mouse 100 in the negative x direction (i.e., laterally to the left) so as to cause corresponding cursor movement, mouse 100 is pushed to the left with the middle finger M.

Alternatively, to move mouse 100 in the x direction so as to cause corresponding cursor movement, the user may bend the user's wrist W to the right and left while holding onto mouse 100 with thumb T and middle finger M.

Where large movement of the cursor is desired, such as moving the cursor from one edge of the display screen to the opposite edge, mouse 100 is moved with a sweeping motion while holding the mouse with thumb T and middle finger M. For example, to move the cursor from the bottom of the display screen to the top of the display screen, first, the user fully extends the user's thumb T and middle finger M, translating the mouse 100 distally, which in turn causes the cursor to move part way up the display screen. Next, the user lifts mouse 100 up off mouse pad 150 and flexes their thumb T and middle finger M, while mouse 100 is off the mouse pad 150, so as to bring mouse 100 back to its initial position on mouse pad 150. With the mouse 100 sitting on the mouse pad 150, the user then extends their thumb T and middle finger M for additional translation of mouse 100, and hence corresponding cursor movement. This sweeping motion is repeated until the cursor is close to the desired position.

The user may employ a similar sweeping maneuver to effect large cursor travel in the x direction.

By grasping mouse 100 with thumb T and middle finger M, the mouse can be moved about as needed, with index finger F being used to activate buttons 125, 130 and 135 as appropriate. Alternatively, mouse 100 can be grasped with thumb T and ring finger R, leaving index finger F and middle finger M to activate buttons 125, 130 and 135 as appropriate.

Figure 4:
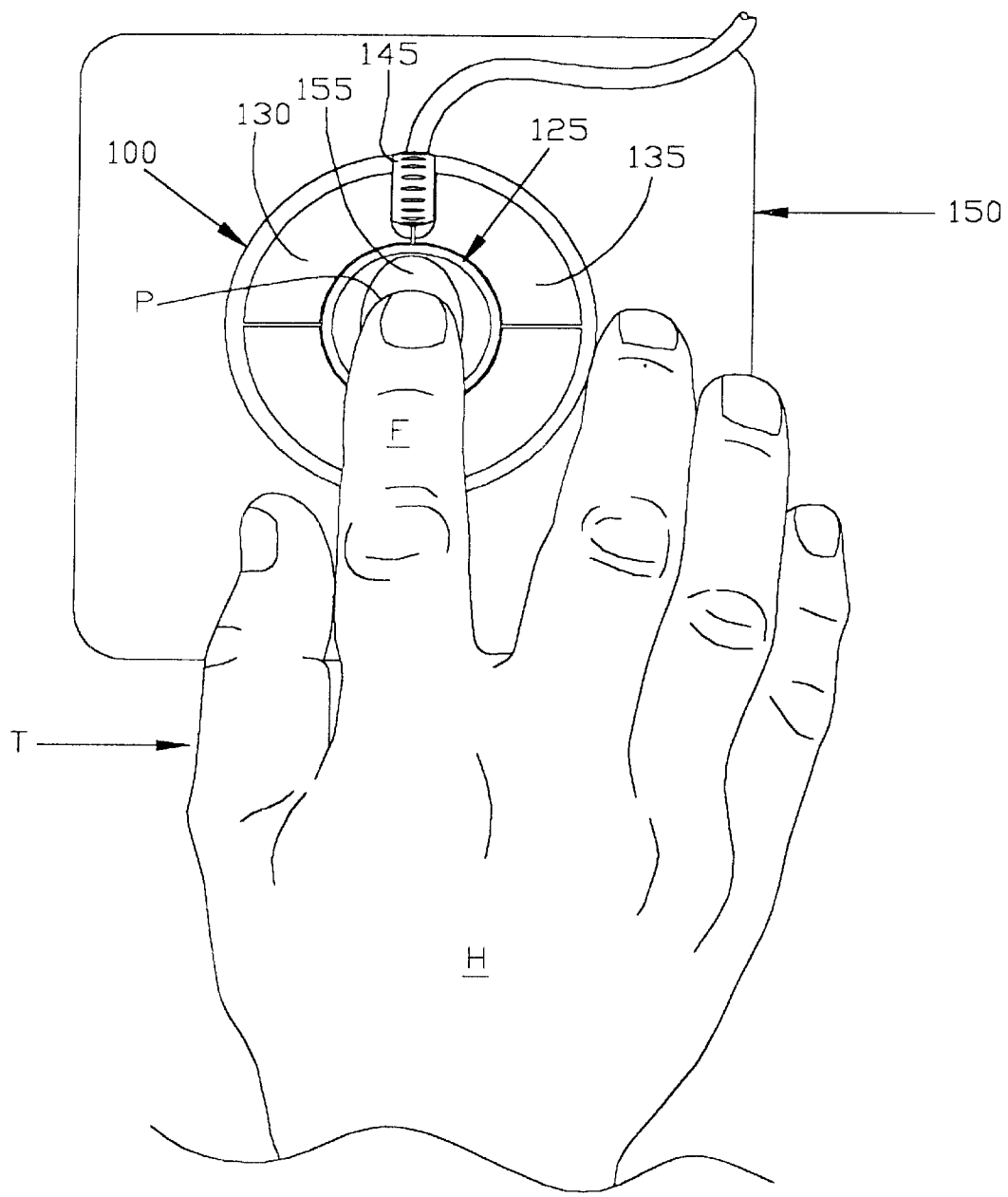
FIG. 4 is another top plan view of the mouse shown in FIG. 1, but with the mouse being controlled by a single finger of the user.

Another method of controlling cursor movement with mouse 100 is by dragging mouse 100 with index finger F positioned on the primary button 125, in the manner shown in FIG. 4. Mouse 100 can be dragged via the primary button 125, without actuating the primary button 125, by selecting a primary button microswitch (not shown) having a sufficiently stiff spring. Alternatively, the tip P of the index finger F may engage the sides of the depression 155 in the primary button 125 such that mouse 100 may be pushed frontwards and/or backwards and/or sideways without generation of sufficient vertical force to activate primary button 125.

Depression 155 also may include a small protrusion 160, best seen in FIG. 1, in primary button 125 that engages the inserted finger tip P. Traction between finger tip P and primary button 125 may also be increased with a material having a high coefficient of friction. Such materials are well known in the art.

Small and fine cursor movements are best obtained by using index finger F to engage primary button 125 for mouse movement. Vertical cursor movement is preferably controlled by flexing and extending index finger F against the wall of depression 155, causing mouse 100 to move in the y direction. Horizontal cursor movement is preferably controlled by sideways movement of index finger F against the wall of depression 155, causing the mouse 100 to move in the x direction.

Once the cursor has reached a desired location, the user may make a selection by "clicking", or depressing, primary button 125 with the same index finger F.

The foregoing operation of controlling cursor position, and making selections, is intuitive to the user and is carried out without hesitation or requiring additional motions of the user's index finger F.

A common cursor function is to drag an object or selected text by: (1) positioning the cursor on the desired object or text; (2) imparting sustained force on an appropriate button, e.g., the left button in a typical electronic mouse; (3) moving the mouse to a desired position; and (4) releasing the force on the button, thereby releasing the dragged object where the cursor is repositioned.

The present invention simplifies this operation. The user positions mouse 100 with index finger F such that the cursor is moved to a desired position on the screen. Once the cursor is proximate to a desired object on the display screen, the user selects the object by clicking primary button 125. This is done by imparting a sufficient force on primary button 125 with the tip P of the user's index finger F. To drag the object, the user maintains force on primary button 125 with index finger F while, at the same time, moving mouse 100 with the same index finger F.

In one preferred manner of use, the cursor may be roughly positioned with sweeping motions using thumb T and middle finger M as previously described. When the cursor is close to the desired location on the display screen, control of the cursor is effected by movement of mouse 100 using index finger F to engage primary button 125.

Referring again to FIG. 1, a scrolling mechanism 145 is also provided for. Scrolling mechanism 145 can be located in front of, or behind, primary button 125. In general, primary button 125 is located along a midline longitudinal axis.

When the mouse employs a roller ball for determining movement of the mouse, the ball is preferably located directly below primary button 125 so as to avoid any swiveling effect when mouse 100 is moved. Primary button 125 is preferably located near the center of the mouse's body.

Figure 5:
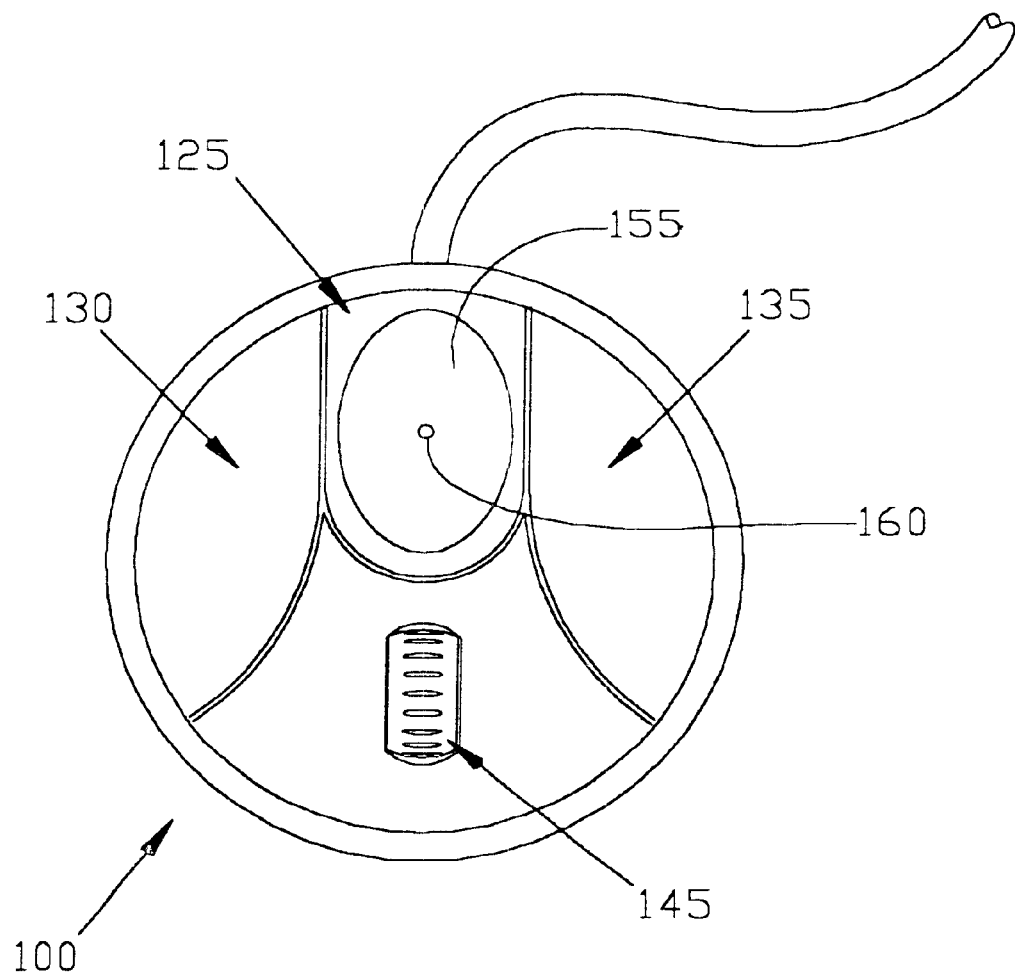
FIG. 5 is a top plan view of another embodiment of the invention.
Figure 6:
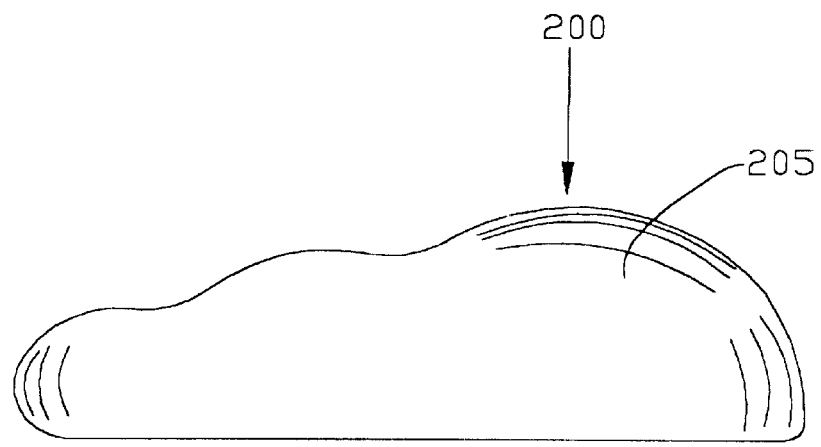
FIG. 6 is a side elevational view of a rear extension which may be attached to the mouse of FIG. 1.
Figure 7:
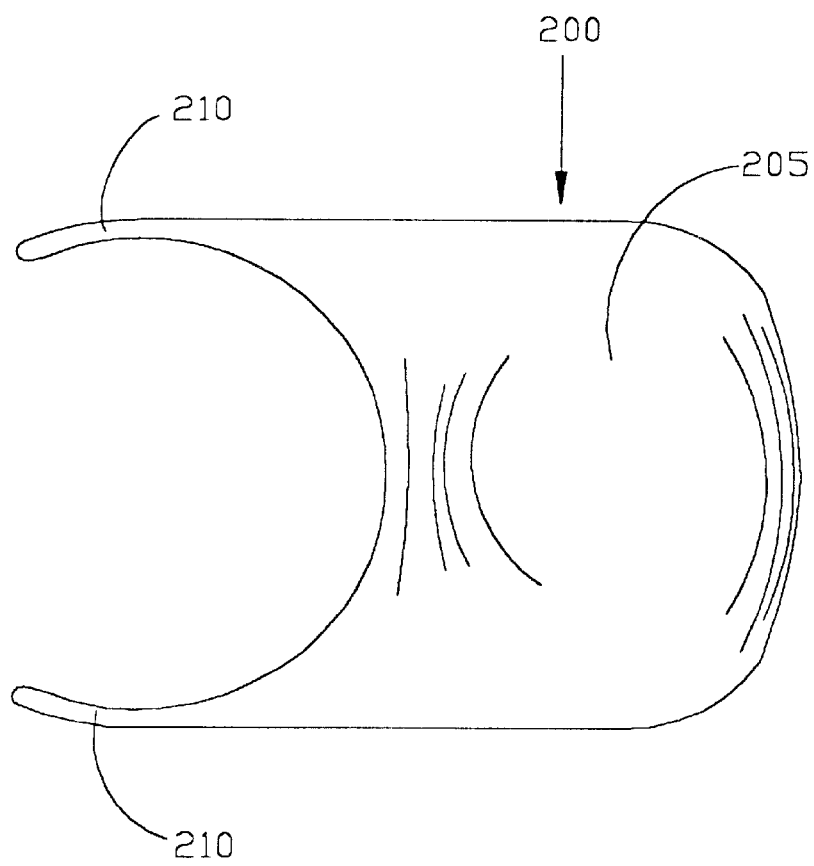
FIG. 7 is a top plan view of the rear extension shown in FIG. 6.
Figure 8:
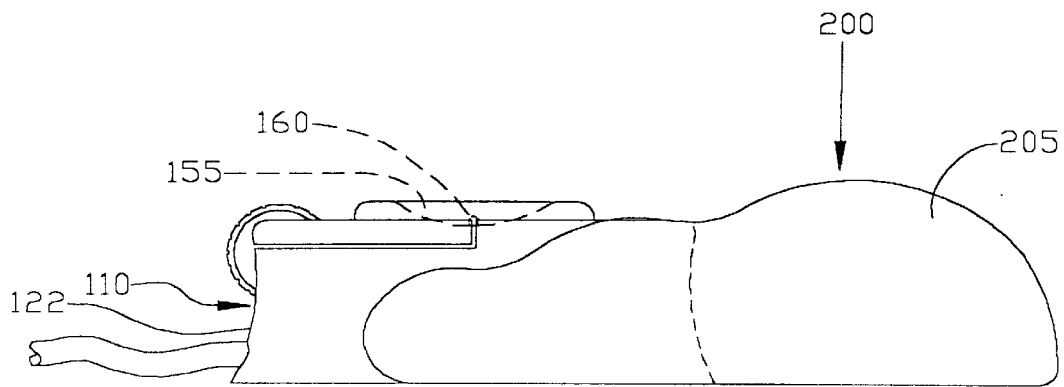
FIG. 8 is a side elevational view showing the rear extension of FIG. 6 attached to the mouse of FIG. 1.
Figure 9:
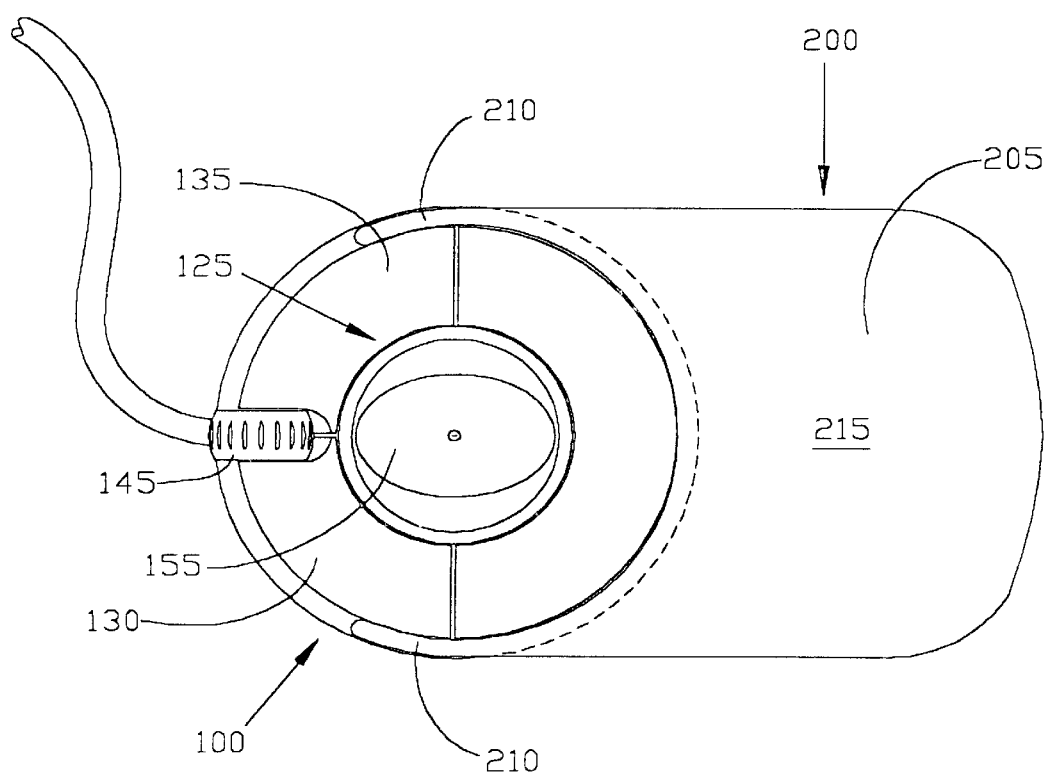
FIG. 9 is a top plan view showing the rear extension of FIG. 6 being attached to the mouse of FIG. 1.

Referring to FIG. 5, a modification of the present embodiment provides a primary button 125 located in the forward end 140 of mouse 100. In this case, scrolling means 145 can be located behind primary button 125.

Looking next at FIGS. 6-9, there is shown a rear extension 200 which may be attached to the rear of mouse 100. Rear extension 200 is provided for those users who prefer a mouse with a larger bulk not unlike a conventional mouse. Rear extension 200 generally comprises a body 205 and a pair of forwardly-extending arms 210. Arms 210 are complementary to the mouse's circumferential groove 122, and extend beyond the equator of the mouse's housing 105, such that arms 210 can snap into groove 122 and thereby lock rear extension 200 to mouse 100. Rear extension 200 is preferably formed out of a tough, durable, light-weight plastic.

If desired, rear extension 200 could be formed with a relatively flat upper rear surface 215, with or without additional input buttons (not shown) and/or an electronic input pad (also not shown) to permit pen entry of a signature or sketch. Of course, where rear extension 200 includes such buttons or electronic input pad, rear extension 200 must also be electrically connected to mouse 100 so that the signals from the buttons or electronic input pad can be transferred to the mouse and hence to the computer. Such an electrical connection can be achieved in ways well known in the art, e.g., by using simple male-female plug-in electrical connectors.

Figure 10:
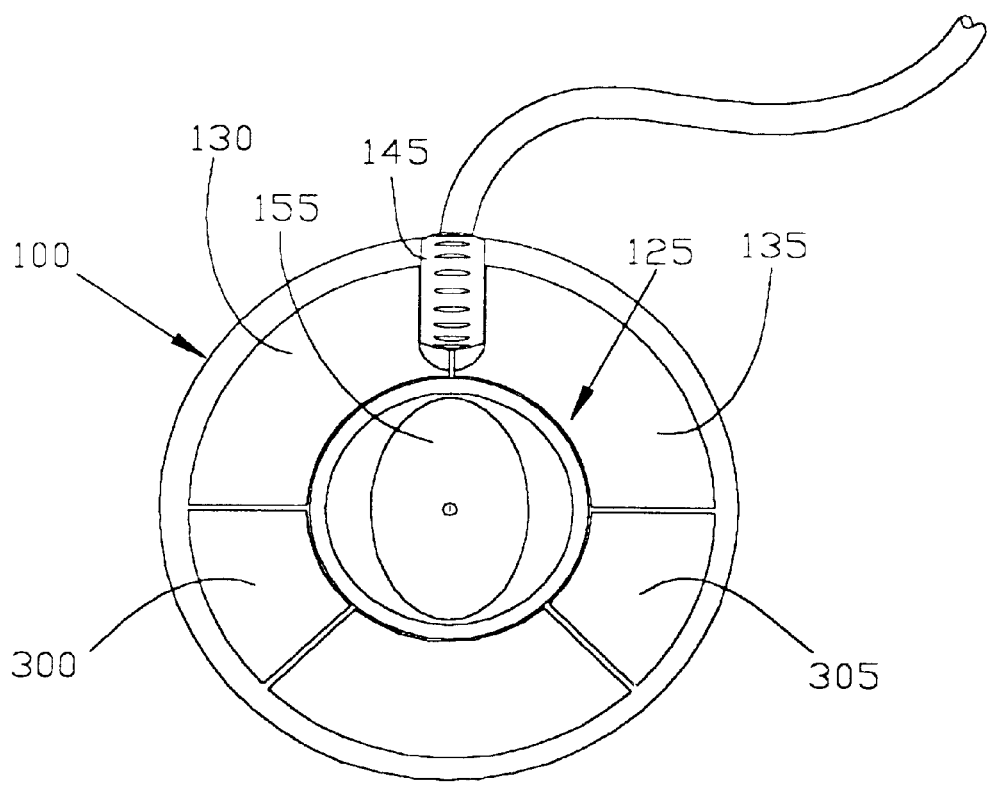
FIG. 10 is a top plan view of still another form of mouse formed in accordance with the present invention.

Looking next at FIG. 10, it is also possible to provide two additional buttons 300, 305 to mouse 100. Buttons 300, 305 may be configured to activate the "backward" and "forward" buttons of a Web browser, so as to facilitate Web browsing actions using mouse 100.

In another embodiment of the present invention, the electromechanical activation switch of primary button 125 is replaced by a pressure sensor wherein pressure on the primary button 125 by the finger F causes an electronic signal to be sent to the computer, and further wherein the amplitude of the electronic signal is a function of the magnitude of the pressure applied by the finger. This embodiment of the invention is particularly useful in graphic software, where the level of the digital pressure is translated as the thickness of a line drawn on the computer screen. In other words, a thicker line may be drawn by pressing harder on primary button 125, while moving mouse 100 at the same time, and a thinner line may be drawn by reducing the pressure on primary button 125. In this embodiment, the left button 130 and the right button 135 can be programmed to correspond to the left and right buttons of a conventional electronic mouse.

In yet another embodiment of the present invention, the scrolling wheel 145, instead of scrolling a computer display to unobserved portions of the computer display, can be programmed to move the cursor on the computer display in the third axis as may be the case in three dimensional graphics representation. Yet another use of the scrolling wheel 145 is to program it to act a continuous zoom function either by itself or in combination with any one of the control keys on the keyboard.

What is claimed is:

1. A pointing device comprising a pointing device body for positioning on a surface in both the x-direction and y-direction of an x, y, z coordinate field and a first button on said pointing device body for engagement by the finger for positioning said pointing device, said first button actuated by a minimum vertical force in the z-direction, wherein said first button includes means configured for engagement by a finger whereby the finger can move the pointing device in the x-direction and y-direction without moving said first button in the z-direction.

2. A pointing device according to claim 1, said pointing device including side walls having a concave surface.

3. A pointing device according to claim 1, said pointing device having a generally frusto-conical shape.

4. A pointing device according to claim 1, said pointing device having a plan view defining a generally circular shape.

5. A pointing device according to claim 1, said first button being responsive to an activation force for activating a first switch.

6. A pointing device according to claim 5 wherein said first button is responsive to the activation force exerted in an activation direction, said first button being unresponsive to forces exerted in a direction other than said activation direction.

7. A pointing device according to claim 5 wherein said first button is responsive to an activation force exerted in a generally downward direction, said first button being unresponsive to forces exerted in other than a downward direction.

8. A pointing device according to claim 1, said first button being positioned centrally on said pointing device.

9. A pointing device according claim 1, said first button including a protrusion extending therefrom.

10. A pointing device according to claim 1, said first button having a depression therein.

11. A pointing device according to claim 10, wherein said depression is complementary to the shape of the finger.

12. A pointing device according to claim 10, including a protrusion extending out of said depression.

13. A pointing device according to claim 1, including a second button responsive to a second activation force for activating a second switch.

14. A pointing device according to claim 13, said second button being located in front of said first button.

15. A pointing device according to claim 13, said second button being positioned on a forward portion of said pointing device.

16. A pointing device according to claim 13, including a third button responsive to a third activation force for activating a third switch.

17. A pointing device according to claim 16, said third button being located in front of said first button.

18. A pointing device according to claim 16, said third button being positioned on a forward portion of said pointing device.

19. A pointing device according to claim 16, said first button being proximal to said second and third buttons.

20. A pointing device according to claim 16, said first button being interposed between said second button and said third button.

21. A pointing device according to claim 1, including scrolling means for scrolling a computer display to unobserved portions of the computer display.

22. A pointing device according to claim 21, said scrolling means being positioned on a forward portion of said pointing device.

23. A pointing device according to claim 21, said scrolling means being positioned forward of said first button.

24. A pointing device according to claim 1, further including a rear extension adapted to be attached to said mouse.

25. A pointing device according to claim 24, wherein said pointing device comprises a peripheral groove, and further wherein said rear extension comprises a pair of arms adapted to be snapped into said groove so as to attach said rear extension to said pointing device.

26. The pointing device according to claim 1 wherein said first button is configured to sense a magnitude of a force applied to said button.

27. A pointing device according to claim 1 wherein said first button is configured for engagement by the finger for positioning said pointing device and further wherein said pointing device has a frusto-conical shape.

28. A pointing device according to claim 1 wherein said first button is configured for engagement by the finger for positioning said pointing device and further wherein said first button includes a protrusion extending therefrom.

29. A pointing device according to claim 1 wherein said first button is configured for engagement by the finger for positioning said pointing device and further wherein said first button has a depression therein including a protrusion extending out of said depression.

30. A pointing device according to claim 1 wherein said first button is configured for engagement by the finger for positioning said pointing device, and further comprising a second button responsive to a second activation force for activating a second switch, and further wherein said second button is located in front of said first button.

31. A pointing device according to claim 1 wherein said first button is configured for engagement by the finger for positioning said pointing device, and further comprising a second button responsive to a second activation force for activating a second switch, and further wherein said second button is positioned on a forward portion of said pointing device.

32. A pointing device according to claim 1 wherein said first button is configured for engagement by the finger for positioning said pointing device, and further comprising a second button responsive to a second activation force for activating a second switch, a third button responsive to a third activation force for activating a third switch, and further wherein said third button is located in front of said first button.

33. A pointing device according to claim 1 wherein said first button is configured for engagement by the finger for pointing said pointing device, and further comprising a second button responsive to a second activation force for activating a second switch, a third button responsive to a third activation force for activating a third switch, and further wherein said third button is positioned on a forward portion of said pointing device.

34. A pointing device according to claim 1 wherein said first button is configured for engagement by the finger for pointing said pointing device, and further comprising a second button responsive to a second activation force for activating a second switch, a third button responsive to a third activation force for activating a third switch, and further wherein said first button is interposed between said second button and said third button.

35. A pointing device according to claim 1 wherein said first button configured for engagement by the finger for pointing said pointing device, and further comprising scrolling means for scrolling a computer display to unobserved portions of the computer display, and further wherein said scrolling means are positioned on a forward portion of said pointing device.

36. A pointing device according to claim 1 wherein said first button is configured for engagement by the finger for pointing said pointing device, and further comprising scrolling means for scrolling a computer display to unobserved portions of the computer display, and further wherein said scrolling means are positioned on a forward portion of said pointing device.

37. A pointing device according to claim 1 wherein said first button is configured for engagement by the finger for pointing said device and further comprising a rear extension adapted to be attached to said pointing device.

38. A pointing device according to claim 1 wherein said first button is configured for engagement by the finger for positioning said pointing device and further wherein said first button is positioned at substantially the horizontal center of said pointing device.

39. A pointing device according to claim 1 wherein said first button is configured for engagement by the finger for positioning said pointing device and further wherein said first button forms a recess to receive the finger for positioning said pointing device relative to a surface.

40. A method for manipulating a cursor in a computer display comprising:

engaging the button of a pointing device with a finger, wherein said button is responsive to a vertical activation force for activating a switch; and exerting a substantially horizontal force against the button that does not activate the switch but is sufficient to horizontally translate the position of the pointing device relative to a horizontal plane, wherein said button includes means configured for engagement by the finger whereby the finger can move the pointing device in the x-direction and y-direction without moving said button in the z-direction.

41. A method according to claim 24 wherein the button is responsive to the activation force exerted in an activation direction, with the button being unresponsive to forces exerted in directions other than an activation direction.

42. A method according to claim 40 wherein the button is responsive to the activation force exerted in a generally downward direction, the button being unresponsive to forces exerted in other than a downward direction.

43. A method according to claim 40 wherein:

said manipulating includes positioning an object in the computer display;

and further wherein said method includes:

translating the pointing device so that the cursor is associated with a desired target; and exerting force on the button in an activation direction, thereby activating the switch.

44. A method according to claim 43, including exerting a force against the button in other than the activation direction in an amount sufficient to translate the position of the pointing device.

45. A method according to claim 43, including scrolling a computer display to unobserved portions of the computer display.

46. A method according to claim 43, including rotating scrolling means with a thumb or finger to display unobserved portions of the computer display.

47. A pointing device comprising a first button adapted to be engaged by a finger for positioning said pointing device, and a rear extension adapted to be attached to said pointing device, wherein said pointing device comprises a peripheral groove, and further wherein said rear extension comprises a pair of arms adapted to be snapped into said groove so as to attach said rear extension to said pointing device.

48. A pointing device comprising a pointing device body adapted to be dragged across a surface in the x-direction and y-direction of an x, y, z coordinate field, and a button on said pointing device body adapted for movement in the z-direction, wherein said button includes means adapted to be engaged by a finger whereby the finger can drag the pointing device in the x-direction and y-direction without moving said first button in the z-direction.

* * * * *